US012066919B2

(12) United States Patent
Lara et al.

(10) Patent No.: US 12,066,919 B2
(45) Date of Patent: Aug. 20, 2024

(54) SYSTEMS AND METHODS FOR VALIDATING DATA

(71) Applicant: Oracle International Corporation, Redwood Shores, CA (US)

(72) Inventors: Miguel Lara, Zapopan (MX); David Alberto Lopez Apodaca, Zapopan (MX); Jorge Ernesto Diaz Verdin, Guadalajara (MX); Anil Verma, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/473,625

(22) Filed: Sep. 13, 2021

(65) Prior Publication Data

US 2023/0083221 A1 Mar. 16, 2023

(51) Int. Cl.
G06F 9/44 (2018.01)
G06F 8/70 (2018.01)
G06F 11/36 (2006.01)

(52) U.S. Cl.
CPC ........... *G06F 11/3612* (2013.01); *G06F 8/70* (2013.01); *G06F 11/3692* (2013.01)

(58) Field of Classification Search
CPC ..... G06F 11/3612; G06F 8/70; G06F 11/3692
See application file for complete search history.

(56) References Cited

U.S. PATENT DOCUMENTS

| 7,743,090 | B1* | 6/2010 | Gibson | G06F 11/3672 |
| | | | | 709/224 |
| 2008/0209276 | A1* | 8/2008 | Stubbs | G06F 11/3688 |
| | | | | 714/38.14 |
| 2010/0192006 | A1* | 7/2010 | Gharat | G06F 11/3688 |
| | | | | 714/E11.023 |
| 2011/0055190 | A1* | 3/2011 | Alexander | G06F 16/9566 |
| | | | | 707/706 |
| 2013/0185595 | A1* | 7/2013 | D'Alterio | G06F 11/3684 |
| | | | | 714/38.1 |
| 2013/0246470 | A1* | 9/2013 | Price | G06F 16/13 |
| | | | | 707/783 |
| 2018/0357143 | A1* | 12/2018 | Panambur | G06F 11/2289 |
| 2019/0311057 | A1* | 10/2019 | Sung | G06F 16/24542 |
| 2021/0191845 | A1* | 6/2021 | Bach | G06F 11/3692 |

* cited by examiner

*Primary Examiner* — Hang Pan
(74) *Attorney, Agent, or Firm* — Invoke

(57) ABSTRACT

Techniques for validating data in shared environments are disclosed. In some embodiments, a system monitors data during data entry windows and sends notifications when potential a data corruption event is detected. Users may identify what data to monitor by registering queries with the system. During the registration process, the system may execute the query to determine an expected query result. The system may then execute the query one or more additional times during the data entry window to determine whether a subsequent query result diverges from the expected result. If so, then the system may trigger a notification that identifies the potential data corruption event. Users may define notification lists for registered queries to identify recipients of the event notifications, which may span members of multiple teams in a development environment.

20 Claims, 12 Drawing Sheets

Result Details

EXPECTED RESULT
EXECUTED ON: 2020-DEC-02 21:31 PM

| LEDGER_NAME | SEQUENCING_MODE_CODE | LEDGER_LAST_UPDATED_BY | LEDGER_LAST_UPDATED_DATE |
|---|---|---|---|
| Vision City | N | XCCUSER1 | 2020-06-24T20:05:40.253000000Z |
| Vision Foods - Canada Ledger | N | FINUSER1 | 2019-09-09T06:59:45.173000000Z |
| Vision Foods - USA Ledger | N | APP_IMPL_CONSULTANT | 2018-07-24T05:56:34.780000000Z |
| Vision Operations (USA) | N | APP_IMPL_CONSULTANT | 2020-12-03T04:27:31.095000000Z |
| Vision State | N | FINUSER1 | 2017-09-11T16:13:27.876000000Z |

ACTUAL RESULT
EXECUTED ON: 2021-APR-25 12:32 PM

| LEDGER_NAME | SEQUENCING_MODE_CODE | LEDGER_LAST_UPDATED_BY | LEDGER_LAST_UPDATED_DATE |
|---|---|---|---|
| Vision City | N | XCCUSER1 | 2020-06-24T20:05:40.253000000Z |
| Vision Foods - Canada Ledger | N | FINUSER1 | 2019-09-09T06:59:45.173000000Z |
| Vision Foods - USA Ledger | N | APP_IMPL_CONSULTANT | 2018-07-24T05:56:34.780000000Z |
| Vision Operations (USA) | N | APP_IMPL_CONSULTANT | *2020-12-24T05:21:48.989000000Z* |
| Vision State | N | FINUSER1 | 2017-09-11T16:13:27.876000000Z |

Schedule Rerun Validation?

[ Rerun Validation ] — 606

600 — (figure label)
602 — (expected result table)
604 — (actual result table)

FIG. 6

Hello Team,

The next query validation has been created by    ML@ORACLE.COM

| Product Team | Query Name | Query | Expected Result | | | DB Type |
|---|---|---|---|---|---|---|
| SCM Central | Demo query | SELECT ALGO.OWNER_APPLICATION, COUNT(*) AS L FROM FUSION.QP ALGORITHM VERSIONS@FAQAdblink VER, FUSION.QP ALGORITHMS@FAQAdblink ALGO WHERE ALGO.ALGM_ID = VER.ALGM_ID AND ALGO.ALGM_GUID LIKE 'ORA%' AND VER.VERSION_NUM <> 0 GROUP BY ALGO.OWNER_APPLICATION | OWNER_APPLICATION | L | | CDRM |
| | | | OrderOrchestration | 1 | | |
| | | | Subscriptions | 4 | | |

This email has been automatically sent by Fusion Data Hawk Apex Tool

For any queries please contact   dhhelp@ORACLE.COM

Thanks.

FIG. 7

CDRM For EADI Enviornment
CDRM 21.04_3 (DE Window: 20/APR/2021 - 03/MAY/2021 05:00PM PST)

| Suite | Total Active Validations (Compare) | Total Active (Compare) | Total Active (Informational) | Last Execution Report (Compare) | # Of Passed (Compare) | # Of Failures (Compare) | # Of Not Run (Compare) | Last Execution Report (Informational) | # Of Run (Informational) | # Of Not Run (Informational) | Add Validation | Rerun All (Compare) |
|---|---|---|---|---|---|---|---|---|---|---|---|---|
| ATK | 0 | 0 | 0 | ATK Report | 0 | 0 | 0 | ATK Report | 0 | 0 | | RUNNING AS PER SCHEDULE OF ATK |
| CFQ | 0 | 0 | 0 | CFQ Report | 0 | 0 | 0 | CFQ Report | 0 | 0 | (+) | (△) |
| COMMON | 6 | 0 | 6 | COMMON Report | 0 | 0 | 0 | COMMON Report | 1 | 0 | (+) | (△) |
| CRM | 3 | 2 | 1 | CRM Report | 2 | 0 | 0 | CRM Report | 0 | 0 | (+) | (△) |
| FIN | 3 | 3 | 0 | FIN Report | 1 | 2 | 0 | FIN Report | 0 | 0 | (+) | (△) |
| FRE | 0 | 0 | 0 | FRE Report | 0 | 0 | 0 | FRE Report | 0 | 0 | (+) | (△) |
| FRPM | 0 | 0 | 0 | FRPM Report | 0 | 0 | 0 | FRPM Report | 0 | 0 | (+) | (△) |
| FSM | 0 | 0 | 0 | FSM Report | 0 | 0 | 0 | FSM Report | 0 | 0 | (+) | (△) |
| GRC | 0 | 0 | 0 | GRC Report | 0 | 0 | 0 | GRC Report | 0 | 0 | (+) | (△) |
| HCM | 4 | 2 | 2 | HCM Report | 2 | 0 | 0 | HCM Report | 1 | 0 | (+) | (△) |
| HED | 0 | 0 | 0 | HED Report | 0 | 0 | 0 | HED Report | 0 | 0 | (+) | (△) |
| IC | 0 | 0 | 0 | IC Report | 0 | 0 | 0 | IC Report | 0 | 0 | (+) | (△) |
| PRC | 70 | 70 | 0 | PRC Report | 70 | 0 | 0 | PRC Report | 0 | 0 | (+) | (△) |
| PRJ | 15 | 14 | 1 | PRJ Report | 14 | 0 | 0 | PRJ Report | 1 | 0 | (+) | (△) |
| PSCR | 2 | 2 | 0 | PSCR Report | 2 | 0 | 0 | PSCR Report | 0 | 0 | (+) | (△) |
| SCM | 58 | 54 | 4 | SCM Report | 54 | 0 | 0 | SCM Report | 2 | 0 | (+) | (△) |

FIG. 9

| Results for Compare Validation (EEDM) | Execution Status (EEDM) | Query type | Run Interval (Informational Query Only) | Results for Informational Validation (EADI) | Results for Informational Validation (EEDM) |
|---|---|---|---|---|---|
| N/A | N/A | Informational | End of DE | 14-APR-2021 10:09 AM | 04-DEC-2021 07:08 AM |

| Results for Compare Validation (EEDM) | Execution Status (EEDM) | Query type | Run Interval (Informational Query Only) | Results for Informational Validation (EADI) | Results for Informational Validation (EEDM) |
|---|---|---|---|---|---|
| 04-DEC-2020 07:08 AM | Passed | Compare | N/A | N/A | N/A |
| 04-DEC-2020 07:08 AM | Passed | Compare | N/A | N/A | N/A |
| 04-DEC-2020 07:08 AM | Passed | Compare | N/A | N/A | N/A |

| Results for Compare Validation (EEDM) | Execution Status (EEDM) | Query type | Run Interval (Informational Query Only) | Results for Informational Validation (EADI) | Results for Informational Validation (EEDM) |
|---|---|---|---|---|---|
| N/A | N/A | Compare | N/A | N/A | N/A |

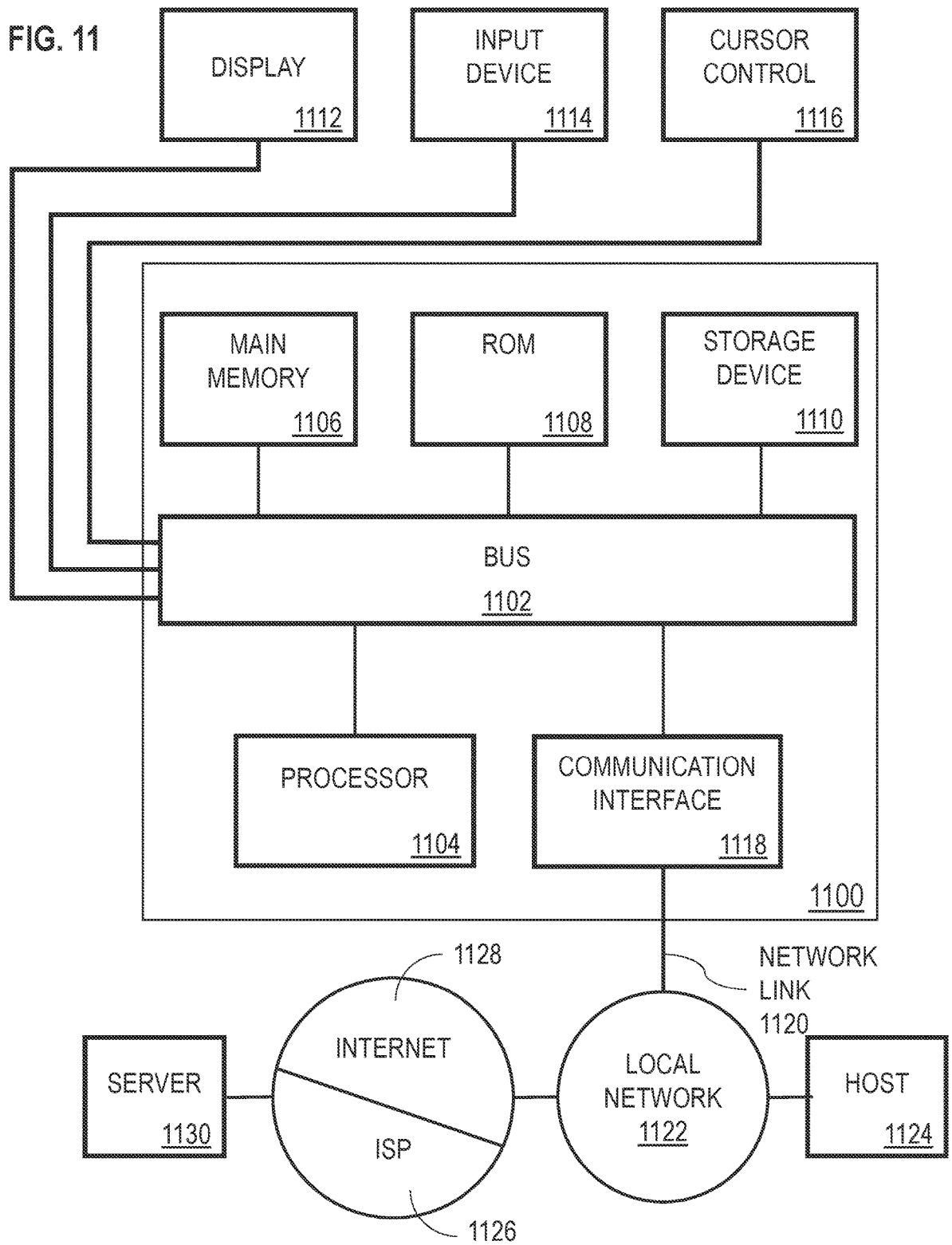

SYSTEMS AND METHODS FOR VALIDATING DATA

TECHNICAL FIELD

The present disclosure relates to validating data in shared and distributed environments. In particular, the present disclosure relates to techniques for monitoring shared data to detect changes that potentially cause unexpected application behavior.

BACKGROUND

The software development lifecycle often involves the coordination and effort of various individuals or teams. For example, during a development phase of the lifecycle, a technical design team may generate a specification that defines the system architecture for an application or new database template, a development team may write the underlying application or template code, and a user interface design team may create a user interface for interacting with the application code. During a testing phase, quality assurance (QA) teams may develop and run automated test processes to identify, analyze, and document problems with a software program or database template. Problems may be reported to other teams to update and fix the application code or design as necessary.

In shared development environments, complications may arise when teams operate independently during the testing phase. Current processes to build database templates include a period of time referred to as a data entry window. When the data entry window is open, automated testing processes or individual team members may be permitted to enter or update the test data in a source database. However, QA groups may include several individuals distributed across different sub-system teams and across different regions. In such situations, one team or individual may not be aware of the data that another team or individual is manipulating, leading to outdated test data in test databases and unexpected test results. As a result, application or database template releases may be delayed or even canceled.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates an example validation result in accordance with some embodiments;

FIG. 7 illustrates an example email notification message in accordance with some embodiments;

FIG. 9 illustrates an example dashboard interface in accordance with some embodiments;

FIGS. 10A and 10B illustrate another example dashboard interface in accordance with some embodiments; and FIG. 11 shows a block diagram that illustrates a computer system in accordance with one or more embodiments.

DETAILED DESCRIPTION

Figure 1:
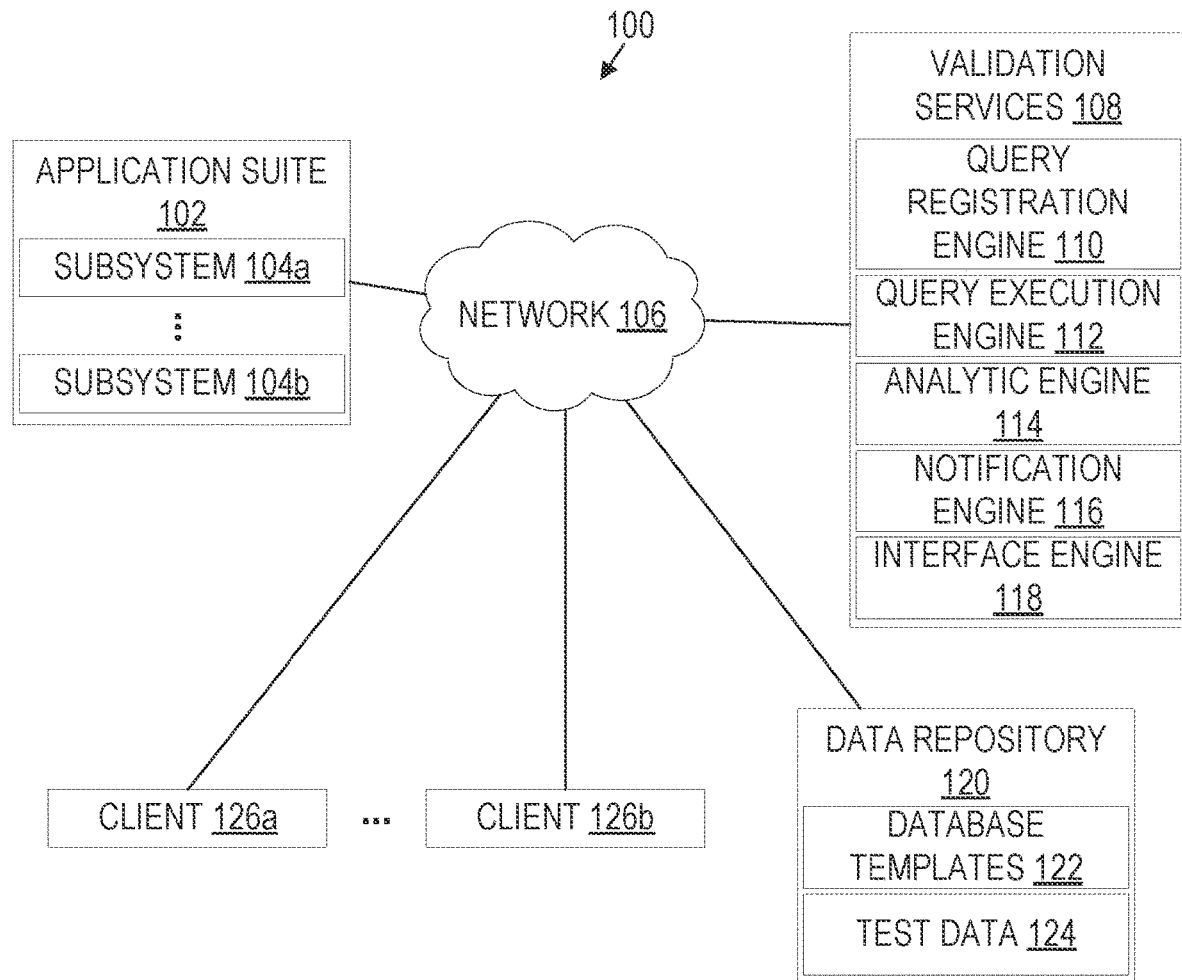
FIG. 1 illustrates a system for monitoring and validating data in a shared environment in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DATA MONITORING AND VALIDATION
   3.1 QUERY REGISTRATION
   3.2 QUERY-BASED DATA VALIDATION
4. VALIDATION RESULT PROCESSING
   4.1 VALIDATION FAILURE HANDLING
   4.2 SUBSYSTEM VALIDATION MONITORING AND ANALYTICS
5. COMPUTER NETWORKS AND CLOUD NETWORKS
6. HARDWARE OVERVIEW
7. MISCELLANEOUS; EXTENSIONS

1. General Overview

Techniques for monitoring and validating data in shared environments are disclosed. The techniques mitigate the risk that changes in data lead to unexpected program behavior. For example, the techniques may help prevent scenarios in which a quality assurance (QA) team member modifies test data that unexpectedly affects testing concurrently performed by another QA team or individual. Thus, the techniques may facilitate the coordination of various tasks that operate on shared data.

One approach for preventing data conflicts and corruption in test data is to create data seeding scripts that populate test data for each test script that the system executes. However, the creation and maintenance of several different test scripts is time-intensive and error-prone. Further, executing seeding scripts for each test case is often resource-intensive and may negatively impact system performance during the testing phase.

Systems and methods described herein streamline the database template creation process. In some embodiments, a system, also referred to as Data Hawk, monitors test data during data entry windows and sends notifications when potential data corruption events are detected. Users may identify what data to monitor by registering queries with the system. The streamlined techniques may be deployed to reduce the time QA teams invest in creating and maintaining data seeding scripts. Further, the techniques may reduce delays in the testing phase of the development lifecycle, allowing for more robust application testing and quicker database template releases.

In some embodiments, the Data Hawk system allows users to register queries that access data that the users would like the system to monitor. During the registration process, the system may execute the queries to determine an expected query results. The system may then execute the query one or more additional times during the data entry window to determine whether a subsequent query result diverges from the expected result. If so, then the system may trigger a notification that identifies the potential data corruption event. Users may define notification lists for registered queries to identify the recipients for system-triggered event notifications. Thus, a user may define a notification list that spans members of multiple teams in a development environment.

When queries are registered, the Data Hawk system may trigger validations in a scheduled manner to prevent overloading a source database with queries. For example, the system may stagger query execution times and/or schedule query execution for times when system load is typically low. The system may further allow users to define execution times and/or frequency during the query registration process to manage system load.

Lage-scale system environments often include several subsystems that share access to data. For example, enterprise software and software suites may include several different software products or applications that share a database. In such environments, the Data Hawk system may associate a registered query with one or more subsystems. The system may then aggregate validation results and run analytics on a per subsystem basis. Based on the validation results and analytics, the system may present an interface, such as a dashboard, to quickly visualize what subsystems have failed validation results and potential data corruption. By providing near-instantaneous notifications and visualizations of where potential data corruption events occur, test data owners and developers may quickly respond to verify the data and determine whether an update was intentional or not. If a data update is intentional, then the query validation results may also be updated for subsequent monitoring. Otherwise, the system may rollback changes to prevent the corruption of QA test results.

One or more embodiments described in this Specification and/or recited in the claims may not be included in this General Overview section.

2. Architectural Overview

In some embodiments, the techniques described herein are implemented in a distributed computing environment where multiple users are able to concurrently access shared data. For example, a development environment may include a shared database where multiple teams run test scripts and/or other automated test processes that access test data. Test data may comprise any data identified for use to test a software application or component thereof, such as a database template. Test scripts may access test data to verify that a particular function or template behaves as expected or is able to respond to unusual inputs. Additionally or alternatively, the techniques may also be applied in other shared data environments where multiple users share access to data.

FIG. 1 illustrates system 100 for monitoring and validating data in a distributed environment in accordance with some embodiments. As illustrated in FIG. 1, system 100 includes software suite 102, validation services 108, data repository 120 and clients 126a-b. In one or more embodiments, system 100 may include more or fewer components than the components illustrated in FIG. 1. The components illustrated in FIG. 1 may be local to or remote from each other. Each component may be distributed over multiple applications and/or machines. Multiple components may be combined into one application and/or machine. Operations described with respect to one component may instead be performed by another component.

In some embodiments, application suite 102 includes a set of one or more software applications or products. For example, an enterprise software suite may include several applications distributed across various product families such as customer relationship management, social media management, resource planning, supply chain management, information technology management, project portfolios, and financial management. A product family may include one or more applications to implement a combination of functionalities to automate tasks, provide analytic insights, and/or otherwise assist application users.

In some embodiments, application suite 102 includes a plurality of subsystems, including subsystems 104a-b. A subsystem may correspond to one or more components of application suite 102. For example, a subsystem may be an application, a family of applications, a set of components associated with a particular function or category, a database schema or object, or any other set of components used to run applications within application suite 102. A subsystem may be associated with a unique identifier, such as a name or descriptive label, which may be used to run data validations and analytics as described further herein.

In some embodiments, validation services 108 includes a set of components that may be invoked to monitor and validate data within the distributed environment. Validation services 108 may further include components that may be invoked to perform analytics, interface with other system components, and render user interfaces to interact with system administrators or other users. Validation services may include query registration engine 110, query execution engine 112, notification engine 114, analytic engine 116, and interface engine 118. Each component of validation services 108 may implement a different functionality or set of functions as described further herein. As previously mentioned, the components within system 100, including validation services 108 may vary. In some cases, a function performed by one component may be combined or otherwise implemented by another component within system 100. Additionally or alternatively, the components of validation services 108 may execute locally or remotely from one another.

In some embodiments, query registration engine 110 registers queries used to monitor and validate data. The queries that are registered may follow a domain-specific language, such as the structured query language (SQL). Query registration engine 110 may provide a query editor that allows users to create, modify, and delete registered queries. Additionally or alternatively, query registration engine 110 may allow users to submit registration data associated with the query, such as scheduling data, query type information, and subsystem identification data. The registration process is described further below in Section 3.1, titled "Query Registration."

In some embodiments, query execution engine 112 executes registered queries. For example, query execution engine 112 may include a SQL engine that generates one or more query plans for a query, optimizes the query plan, and executes a set of operations in the optimized query plan. Query execution engine 112 may execute data manipulation language (DML) to add, delete, and/or otherwise modify data to a database. Query execution engine 112 may further execute data definition language (DDL) to create and modify database objects such as database tables and views. Additionally or alternatively, query execution engine 112 may execute scripts and/or other query statements to access and modify database data. Query execution engine 112 may execute registered query in a scheduled and/or staggered manner to prevent overloading system 100.

In some embodiments, analytic engine 116 generates analytic insights based on validation results provided through query execution. For example, analytic engine 116 may aggregate and analyze sets of validation results to identify and isolate subsystems that are experiencing potential data corruption. The information may be provided so that test data owners may act to address problematic subsystems within application suite 102.

In some embodiments, notification engine 116 generates and sends notifications based on the queries and validation results. For example, notification engine 116 may generate email messages, application-presented messages, short message service (SMS) messages, and/or message queue entries. Additionally or alternatively, notification engine 118 may generate and send other forms of electronic messages. A notification may identify the query and validation results for one or more registered queries. Additionally or alternatively, a notification may identify analytic insights, such as aggregated validation results for a given subsystem or set of subsystems.

Interface engine 118 may provide a user interface for interacting with validation services 108. Example user interface may comprise, without limitation, a graphical user interface (GUI), an application programming interface (API), a command-line interface (CLI) or some other interface that allows users to invoke one or more of validation services 108 to process time-series data. Clients 126a-b may render user interface element items provided through interface engine 118. For example, a client may be a browser, mobile app, or application frontend that displays user interface elements for invoking one or more of validation services 108 through a GUI window. Examples of user interface elements include checkboxes, radio buttons, dropdown lists, list boxes, buttons, toggles, text fields, date and time selectors, command lines, sliders, pages, and forms.

Clients 125a-b may correspond to a human user, a client program, or an application interface. Clients 125a-b may access validation services 108 to register queries, monitor data, and check validation results. A client may execute locally on the same host as validation services 108 or may execute on a different machine. If executing on a different machine, the client may communicate with validation services 108 via network 106 according to a client-server model, such as by submitting hypertext transfer protocol (HTTP) requests invoking one or more of the services and receiving HTTP responses that include results generated by one or more of the services.

In some embodiments, network 106 represents one or more interconnected data communication networks, such as the Internet, that may be used to transport data between application suite 102, validation services 108, clients 126a-b, and/or data repository 120. System components may transmit messages and control signals using one or more communication protocols. Example communication protocols include HTTP, the simple network management protocol (SNMP), and other communication protocols of the internet protocol (IP) suite.

In embodiments, data repository 120 is any type of storage unit and/or device (e.g., a file system, database, collection of tables, or any other storage mechanism) for storing data. Further, data repository 120 may include multiple different storage units and/or devices. The multiple different storage units and/or devices may or may not be of the same type or located at the same physical site. Further, data repository 120 may be implemented or may execute on the same computing system as one or more other components of system 100. Alternatively or additionally, data repository 120 may be implemented or executed on a computing system separate from one or more components of system 100. Data repository 120 may be communicatively coupled to other system components via a direct connection and/or via network 106.

In some embodiments, data repository 120 includes volatile and/or non-volatile storage for storing database templates 122 and test data 124. A database template may include one or more files that may be used to create a database, such as a test database. During the testing phase, the test database may be populated with test data 124. A database template may be modified based on test results to correct logic errors or other problems. Once the database template has been finalized, it may be deployed in a production environment to create a production database.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device. In some embodiments, application services 108 are exposed through a cloud service or a microservice. A cloud service may support multiple tenants, also referred to as subscribing entities. A tenant may correspond to a corporation, organization, enterprise or other entity that accesses a shared computing resource, such as application services 108. Different tenants may be managed independently even though sharing computing resources. For example, different tenants may have different account identifiers, access credentials, identity and access management (IAM) policies, and configuration settings. Additional embodiments and/or examples relating to computer networks and microservice applications are described below in Section 5, titled "Computer Networks and Cloud Networks."

3. Data Monitoring and Validation 3.1 Query Registration

In some embodiments, a testing phase includes one or more data entry windows. During a data entry window, authenticated and authorized users may populate a database with test data. Different teams may share access to the database. For example, different teams may be responsible for performing unit tests on different system components. Additionally or alternatively, different teams may be responsible for performing different types of QA tests, such as unit tests, system tests, security tests, stress tests, etc. As previously mentioned, it may be difficult to coordinate data entry between several different teams. If a team is unaware of a change to underlying test data made by another team, then the test results may become corrupted.

To mitigate the risk of data corruption, users may register queries with the Data Hawk system in accordance with some embodiments. Registered queries may identify test data used by test scripts and/or other testing processes. Additionally or alternatively, a registered query may identify other data that a user would like to monitor. Users may register queries before or during a data entry window.

Figure 2:
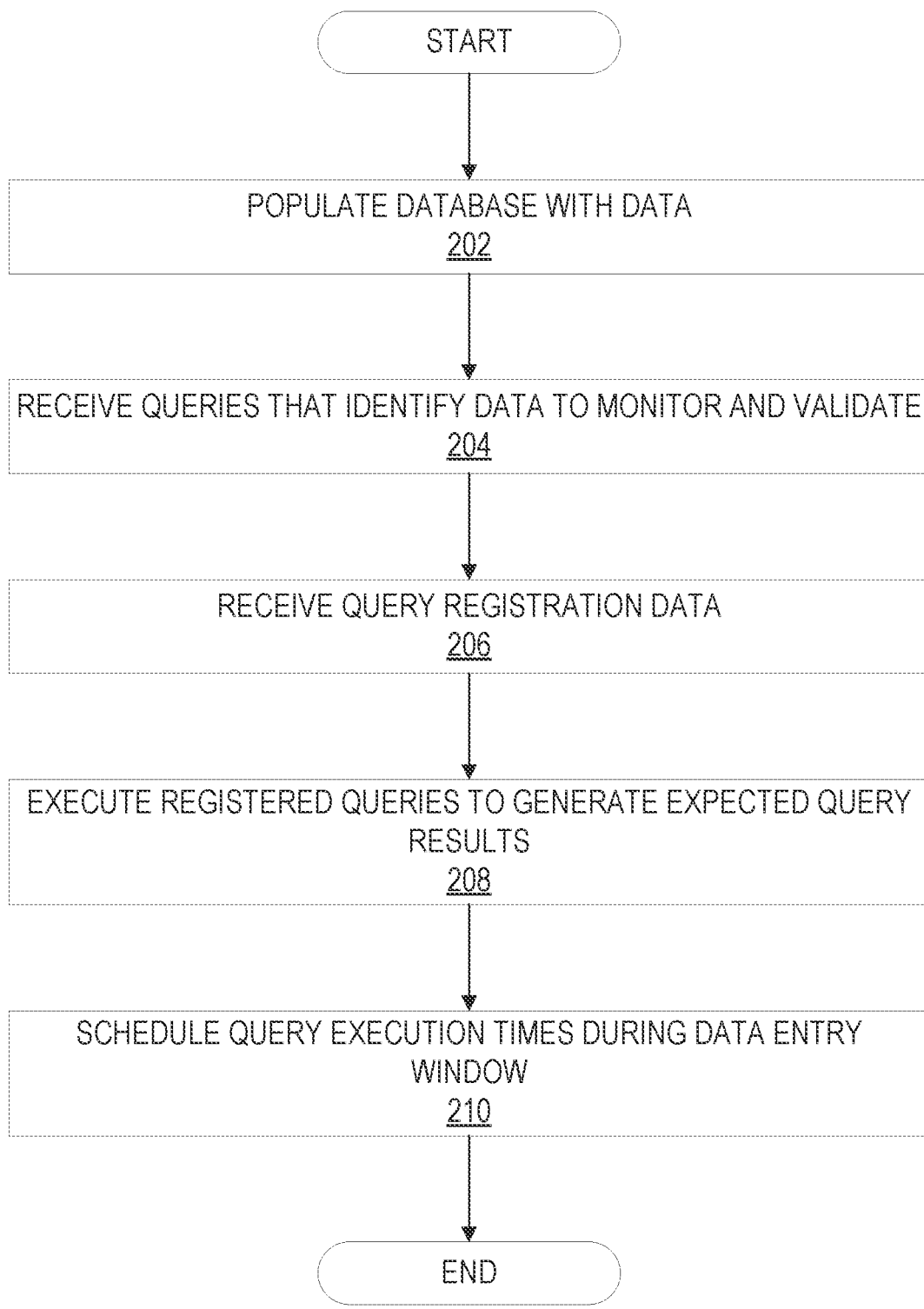
FIG. 2 illustrates an example set of operations for registering queries in accordance with some embodiments.

FIG. 2 illustrates an example set of operations for registering queries in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, the process includes populating a database with data (operation 202). For example, data seed scripts may populate a database with test data or users may submit database queries to create, modify, and/or delete data. Additionally or alternatively, one or more applications of application suite 102 may populate a shared database with data.

In some embodiments, the process receives queries that identify data to monitor and validate (operation 204). The queries may include one or more SQL statements that select, filter, and/or otherwise specify which data to monitor. As an example, the process may receive a request to register the following query:

SELECT object_name;
FROM table_user_objects;
WHERE object_value>100.

The process may then register the query to monitor object names from the user objects table with a value greater than 100. If there is a change to the data satisfying the query, then a notification may be triggered as discussed further below.

In some embodiments, the process further receives query registration data (operation 206). Query registration data may identify one or more parameters associated with the execution and processing of a registered query. For example, query registration data may a query name, query status, query description, query type, and/or query scheduling information. Additionally or alternatively, the query registration data may associate the query with a particular subsystem of application suite 102 and/or a notification list that specifies recipients for notification messages.

In some embodiments, the process executes the registered queries to generate expected query results (operation 208). The system may first execute queries before the start of a data entry window to generate the expected results. In other cases, queries may be registered and executed during an open data entry window. The query results may then be compared to subsequent query execution results to monitor the target data and detect changes.

In some embodiments, the process stores the expected query results in one or more temporary database objects, such as temporary tables. The table may be maintained through the data testing and validation phase. Once complete, the table may be discarded. In some cases, the expected query results may change if data is intentionally changed and validated.

In some embodiments, the process schedules query execution times for the registered queries during one or more data entry windows (operation 210). Query registration data may specify a time and/or frequency for executing the query. For example, the query registration data may specify that a registered query is executed at the start of a data entry window, at the end of the data entry window, and/or during the data entry window. In the latter case, the registration data may specify a day, time, and/or frequency to execute the query. In other embodiments, the system may select times to execute the query using machine learning to identify system load patterns. The system may select times with historically low patterns of load to minimize the processing overhead of executing the registered queries. Additionally or alternatively, the system may stagger the queries to avoid sudden spikes in load.

Figure 3:
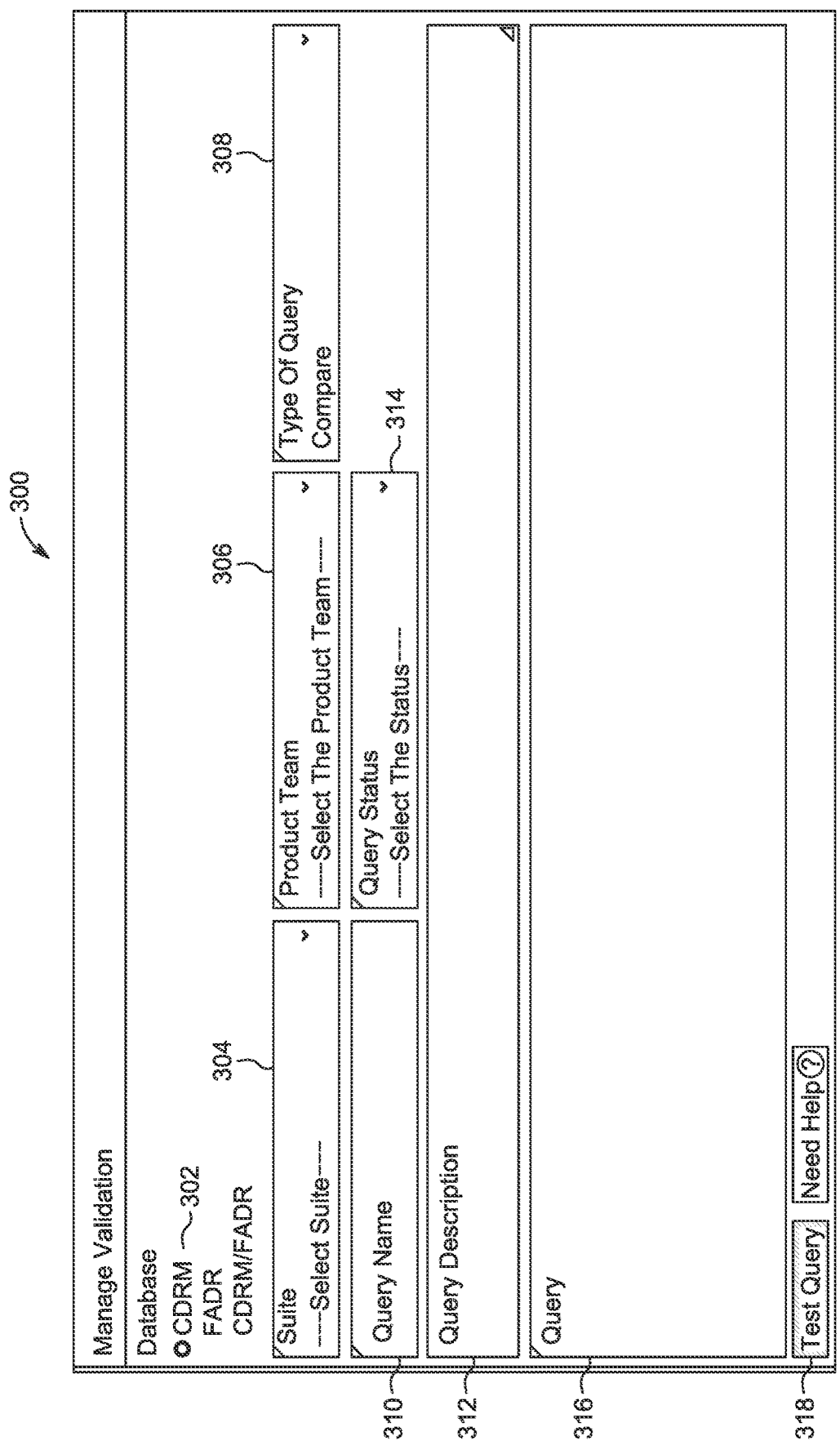
FIG. 3 illustrates an example interface for registering a query in accordance with some embodiments.

FIG. 3 illustrates an example interface 300 for registering a query in accordance with some embodiments. Interface 300 includes radio buttons 302 to select a source database in which to run the query. The user may select a single database or multiple databases, such as cloned databases, to run a registered query.

In some embodiments, interface 300 includes drop-down menu 304 and drop-down menu 306. The interface elements allow a user to specify a subsystem with which to associate a registered query. Specifically, drop-down menu 304 allows a user to specify an application suite in development environments where multiple suites share database templates or source data. Drop-down menu 306 allows the user to specify a product team, family, or category for which to run validations using the registered query. An application family or category may correspond to one or more applications that are related in some way, such as the target userbase and/or functions executed by the applications.

In some embodiments, interface 300 includes drop-down menu 308, which allows the user to specify a type of query. Example query types may include compare queries and informational queries. The user may specify the query type to trigger an alert notification responsive to detecting a validation test failure. In this case, successful validation tests do not trigger alerts. An informational query may generate a notification of the validation results whether successful or not. Other query types may further be defined to trigger other actions based on the results of a validation test.

In some embodiments, interface 300 may present one or more additional interface elements based on the type of query selected. For example, if a user selects an informational query as the query type, then interface 300 may present field that allows the user to schedule execution of the informational query. The user may specify a particular time, such as at the start and/or end of the data entry window, and/or frequency, such as daily or weekly. The user may restrict the number of times informational queries execute to prevent too many results from being presented thereby streamlining the query result presentation. For comparative queries, the system may be configured to send notifications only when a validation test fails. Therefore, the system may schedule and execute comparative queries more frequently than informational queries to provide prompt notice of a potential data corruption event.

In some embodiments, interface 300 includes field 310 to specify a query name. Once provided, the query name may be used as a reference to perform searches and/or other functions. Additionally or alternatively, interface 300 may include field 312, which allows users to provide a query description. A description may be helpful to provide context to the query and the data that is monitored.

In some embodiments, interface 300 includes drop-down menu 314 to specify a query status. The user may set the query to active or inactive. When active, a registered query is executed during data entry windows to monitor and validate data. A user may temporarily or permanently cease execution and data validation for the registered query by switching the associated status to inactive.

In some embodiments, interface 300 includes field 316 for submitting the query text. As previously noted, the query may include one or more SQL statements used to identify the data to validate. Once the user has input the query, the user may select button 318 to test the query. If selected, then the Data Hawk system executes the query to generate a sample query result.

Figure 4:
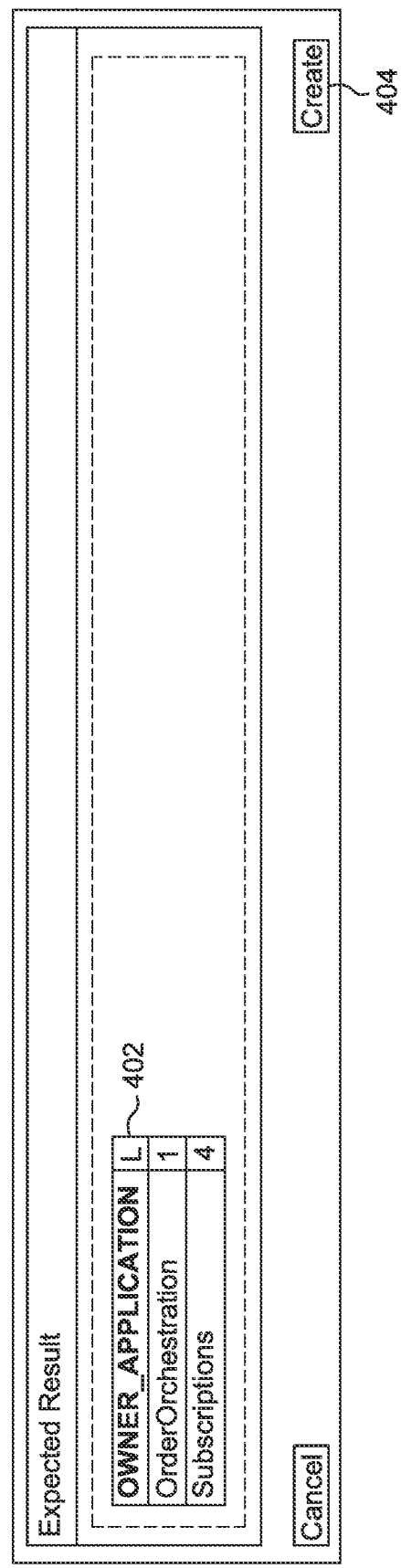
FIG. 4 illustrates a sample query result in accordance with some embodiments.

FIG. 4 illustrates sample query result 400 in accordance with some embodiments. Sample query result 400 may be presented responsive to the user selecting button 318. If the user is satisfied with the query, then the user may select button 402, labelled "Create" to store query result 400 and register the query. Once stored, query result 400 represents the expected result for the registered query, which may be used to monitor and validate data as described further herein. If the user is not satisfied with the sample query result, then the user may edit the query and/or modify the underlying test data. The user may then select button 318 to update the query result. The process may continue until the user is satisfied with the result and selects button 402 to register the query.

3.2 Validation Tests and Notifications

In some embodiments, system 100 performs validation tests based on the registered queries during data entry windows. A data entry window represents a period of time during which users, such as members of one or more QA teams and development teams, are permitted to insert, delete, update, or otherwise modify test data within a source database. When the window closes, system 100 may prevent the users from submitting further modifications to the test data.

In some embodiments, interface engine 118 presents an interface through which a user may schedule one or more data entry windows. For example, interface engine 118 may present a calendar that allows an administrator to select the start date, start time, end date, and end time for a window. The length of a data entry window may thus be configurable by the administrator. Further, the administrator may schedule multiple data entry windows for a single or multiple test phases during the development process.

In some embodiments, the start of a data entry window signals the Data Hawk system to begin data validation testing. During this period, the system may execute the registered queries to run validation tests and generate validation results. The execution time(s) and/or frequency for each registered query may vary depending on various factors such as the type of query and timing data, if any, provided by the query owner submitted during the registration process. For example, a compare query may execute daily, hourly, or at some other interval while an informational query may execute once at the beginning or end of the data entry window. Additionally or alternatively, different queries of the same type may execute at different timing intervals or the same intervals depending on the implementation and the registration data. Once a data entry period is closed, the Data Hawk system may stop performing validation testing and executing the registered queries until the next data entry window beings.

Figure 5:
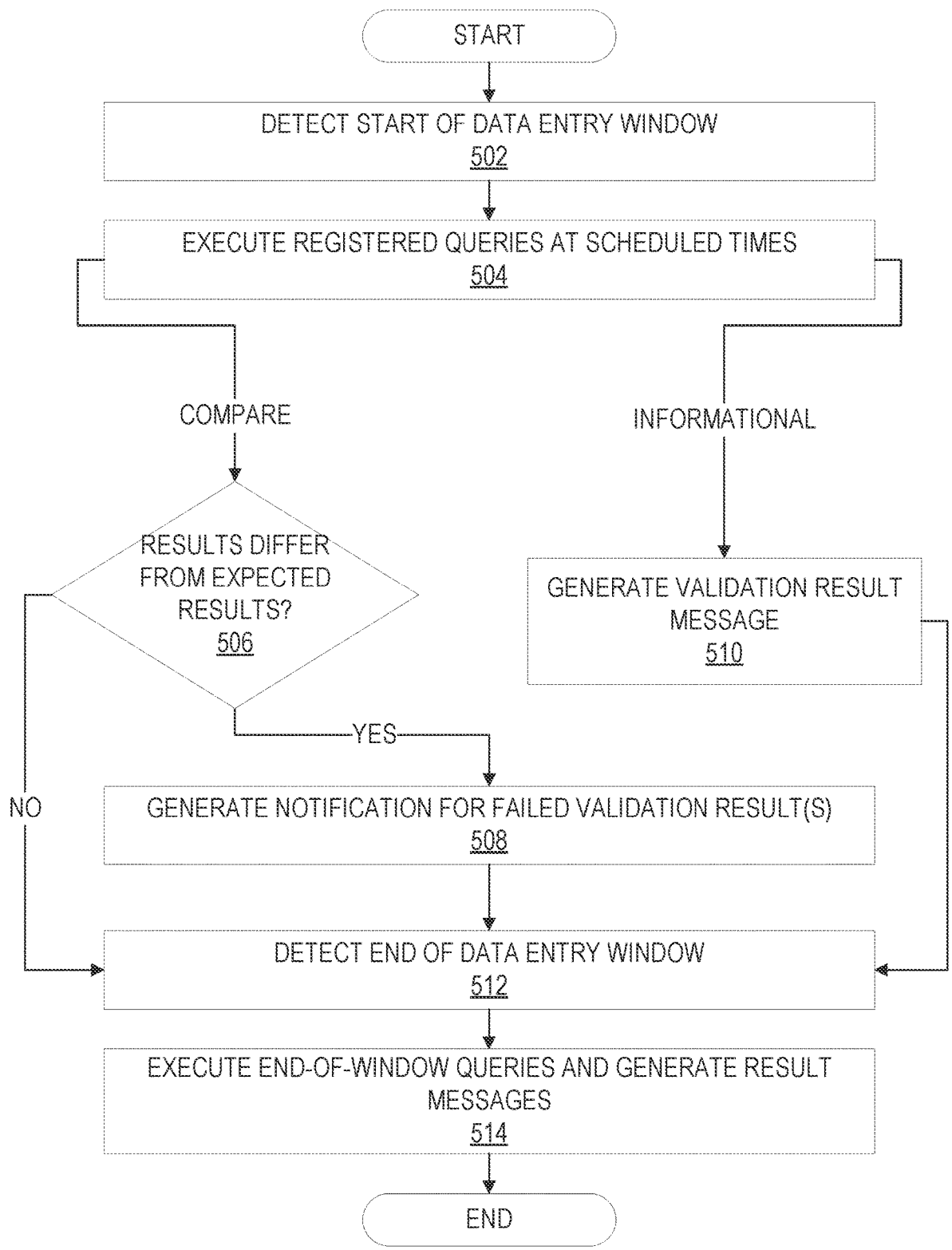
FIG. 5 illustrates an example set of operations for validating data in a shared environment in accordance with some embodiments.

FIG. 5 illustrates an example set of operations for validating data in a shared environment in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

Referring to FIG. 5, the process includes detecting the start of a data entry window (operation 502). For example, a calendaring application or scheduler may signal that the data entry window has started once a scheduled time has been reached. In other cases, a client or other user may initiate a new data entry window on demand rather than at a scheduled time.

In some embodiments, the process executes registered queries at the scheduled times (operation 504). For example, the process may execute registered queries, if any, that are scheduled for the start of the data entry window. Executing the queries at the start of a window may allow for a comparison of how target data have changed from the start of one window to the next or from the start of the window to the end of the window. Additionally or alternatively, the process may execute registered queries on a periodic basis, such as hourly, daily, or at some other frequency. As previously mentioned, the timing and frequency may vary between different queries as specified by a user or selected by system 100. The process may further stagger query executions and/or execute queries at historically low load times to minimize the performance impact on system 100.

In some embodiments, when the process executes a query, the process determines whether the query is a compare query or informational query. If the query is a compare query, then the process compares the most recent query result to the expected query result to determine whether the results differ (operation 506).

If the query result is different, then the process generates a notification to alert a user that the validation test has failed (operation 508). In some embodiments, the process identifies a notification list that is linked to or otherwise associated with the registered query. The notification list may specify a list of email addresses or other contact information for a set of recipients to be notified when the validation fails. By default the notification list may include the contact information of the query owner or creator. The notification list may further specify contact information for one or more additional users, such as members of other teams that are interested in monitoring the data for changes. For example, members of various QA teams may have an interest in test data if changes might affect the results of automated testing processes managed by the respective QA teams. If the validation test is successful, then the process may proceed without generating or sending a notification for the compare query execution.

If the query is informational, then the process generates a validation result even if the validation test is successful (operation 510). The result may be sent to members of a notification list as described for the compare query or may be stored for subsequent analysis so the user is not instantly alerted for every successful validation test.

In some embodiments, the process detects the end of the data entry window (operation 512). The data entry window may terminate at a scheduled time or on demand, depending on the particular implementation.

In some embodiments, the process executes registered queries, if any, at the end of the data entry window and generates corresponding result messages (operation 510). Executing the queries at the end of a window may allow for a comparison of how target data have changed since the start of the window or from the end of a window to the end of another window. Notification messages may be sent to the list of recipients as previously described and/or the results may be stored for subsequent analysis.

FIG. 6 illustrates example validation result 600 in accordance with some embodiments. Validation result 600 shows expected result 602 for a registered query and actual result 604 from the most recent query execution. In the present example, the ledger last update value in the fourth row is different than the expected result. The different value may be presented in a different color or otherwise highlighted to bring the cause of the validation failure to the attention of a user. The user may select button 606 to rerun the validation test, which may be useful for validation result processing as described further below.

FIG. 7 illustrates example email notification message 700 in accordance with some embodiments. When a validation test completes, system 100 may generate and send email notification message 700 to the email addresses specified on the notification list. Table 702 provides context about the validation, including the associated subsystem, query name, query text, and expected query result.

4. Validation Result Processing 4.1 Validation Failure Handling

When a validation test fails, the system may notify one or more users of a potential data corruption event. The users may then determine whether to keep or rollback the changes to the test data that caused the validation test to fail. These options may be presented through an interface, such as interface 600, which may include buttons or other user interface elements (not illustrated) that allow the user to select how to handle a validation failure.

If the changes do not negatively impact the testing processes managed by members of the notification list, then a data corruption event may not occur, and an administrator may decide to keep the changes. In some embodiments, system 100 updates the expected query result responsive to a request to keep the changes. For example, if the user requests to keep actual result 604, then system 100 may update expected result 602 by overwriting the previously expected result in the temporary table.

Once updated, the new expected result may be used to perform validation testing for subsequent executions of the query. Thus, the updated expected result is compared to the actual result of the subsequent executions to determine whether there is a match. If the results do not match, then a notification alarm may be triggered.

In some embodiments, the user may request to rollback changes the caused a validation test to fail. In response to the request, system 100 may undo changes to the test data, starting with the most recent and going backward in time, until the results of the registered query match the expected results. To rollback changes, the database may maintain a rollback segment that stores data as it was before changes were made. The request may trigger a rollback statement that then accesses the rollback segment to restore the data to how it existed before changes were made. Additionally or alternatively, the database may maintain redo or undo logs that store a record of changes including inserts, updates, and deletes. The records may be accessed to determine which changes to reverse.

In some embodiments, the user may make other changes to the data. For example, responsive to an alert notification, the user may determine that the changes should not be kept or rolled back. In this case, the user may modify the test data, such as by submitting changes, until satisfied with the query result. The user may select button 606 to rerun the validation test and determine how changes in the data change the actual result relative to the expected result for the registered query.

Additionally or alternatively, system 100 may trigger one or more other actions responsive to detecting a failed validation test. For example, system 100 may pause one or more active test processes that use test data accessed by the registered query that was the source of the failed validation test. System 100 may resume or restart the test processes once the data changes have been verified or rolled back. In other embodiments, system 100 may add an asterisk or other identifier to test results that indicate that the underlying test data may have been corrupted. Other systemic actions may also be defined and/or configured to trigger by a user.

4.2 Subsystem Validation Monitoring and Analytics

In some embodiments, validation services 108 monitors the health and overall validation status of various subsystems of application suite 102, such as subsystem 104a-b. Registration data may link a subsystem with multiple validation queries. During the data entry window, query execution engine 112 may execute each registered query that is active and associated with the subsystem. Analytic engine 114 may then aggregate the validation results to assess the likelihood that the subsystem is experiencing data corruption.

Figure 8:
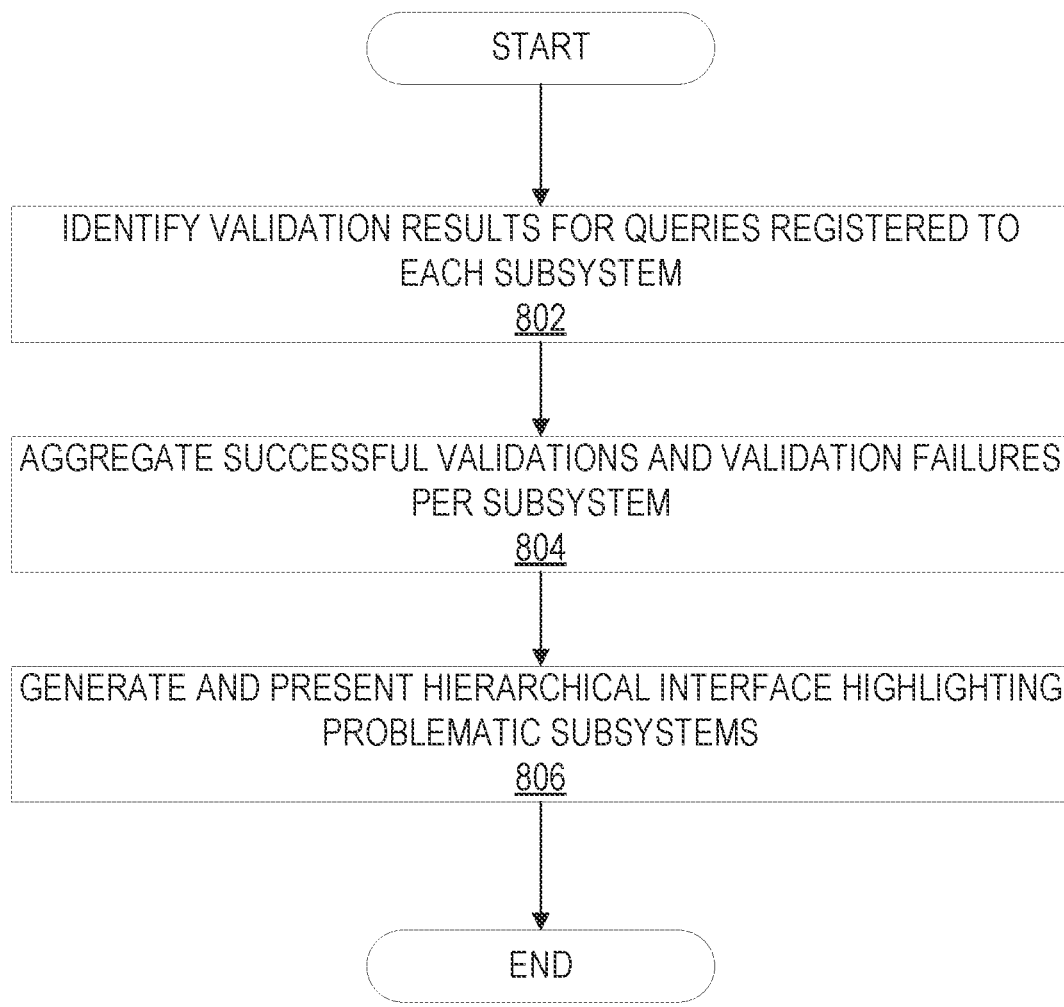
FIG. 8 illustrates an example set of operations for performing subsystem-based validation testing in accordance with some embodiments.

FIG. 8 illustrates an example set of operations for performing subsystem-based validation testing in accordance with some embodiments. One or more operations illustrated in FIG. 8 may be modified, rearranged, or omitted all together. Accordingly, the particular sequence of operations illustrated in FIG. 8 should not be construed as limiting the scope of one or more embodiments.

Referring to FIG. 8, the process includes identifying validation results for queries registered to each subsystem (operation 802). As previously noted, a subsystem may correspond to an application family, category, suite, or other set of related components. In some embodiments, subsystems may share a hierarchical relationship, and there may be overlap in the queries that are registered therewith. For example, an application suite may include a plurality of application families, which each include a plurality of applications. Each application may include a set of registered queries. The application family may group the registered queries that are registered with each application that belongs to the family, and the application suite may group the queries for each application family.

In some embodiments, the process aggregates the successful validations and/or validation failures for each subsystem (operation 804). For example, the process may sum the successful validations and failures on a per application, per application family, and/or per application suite basis.

In some embodiments, the process generates and presents a hierarchical interface highlighting problematic subsystems (operation 806). For example, the process may sort subsystems in a GUI interface in descending order with subsystems having the most validation test failures at the top.

In some embodiments, the interface allows the user to drill down to view aggregation results at varying levels and/or to view individual query results. For example, the interface may present the results for various application suites. The user may drill-down on a problematic suite to view the application families that are most problematic, which may also be sorted based on number of validation test failures. The user may continue to drill down to see the individual query results for an application family.

Subsystem-based actions may further be triggered by the system or a user based on validation test results. For example, the system or a user may temporarily pause testing for a subsystem if the validation failures exceed a threshold. Additionally or alternatively, other actions may be taken, such as rolling back changes or editing a database template to address problems associated with the subsystem.

Additionally or alternatively, notification lists may be defined at a subsystem level. For example, a single notification list may be created for an application family. All queries registered for the subsystem may then be assigned the notification list by default. Thus, a failed validation test for any of the queries associated with the subsystem may trigger an alert notification for the recipients specified in the subsystem-defined notification list.

FIG. 9 illustrates example dashboard interface 900 in accordance with some embodiments. Dashboard interface 900 shows execution status and validation results for a plurality of application suites. The presented analytics include the number of total active validations, the total active compare queries, the total active informational queries, links to the last execution reports, the number of failed compare queries, the number of passed compare queries, the number of run informational queries, and the number of compare and informational queries that have not run. The user may click on or otherwise select a subsystem label to drill-down and view information about each individual subsystem. Additionally or alternatively, the user may search for and filter analytic data based on one or more criteria, such as query text, number of active queries, and/or number of validation failures.

Figure 10A:

FIGS. 10A and 10B illustrate another example dashboard interface 1000 in accordance with some embodiments. Dashboard interface 1000 presents registered queries where the row text contains "FIN". Dashboard interface shows individual queries satisfying the criteria grouped by product suite. In this example, the user may quickly determine that query 1002 and query 1004 have a failed execution status, which are both associated with the same product suite. Various information for each query is presented in each row depicted in FIG. 10A, which continues to FIG. 10B. The figures are separated to allow for more readable text but may be presented on the same dashboard interface on a single screen. The user may drill down further to see the expected and actual results for each query and/or to take corrective action.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates computer system 1100 upon which an embodiment of the invention may be implemented. Computer system 1100 includes bus 1102 or other communication mechanism for communicating information, and a hardware processor 1104 coupled with bus 1102 for processing information. Hardware processor 1104 may be, for example, a general purpose microprocessor.

Computer system 1100 also includes main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes read only memory (ROM) 1108 or other static storage device coupled to bus 1102 for storing static information and instructions for processor 1104. Storage device 1110, such as a magnetic disk or optical disk, is provided and coupled to bus 1102 for storing information and instructions.

Computer system 1100 may be coupled via bus 1102 to display 1112, such as a cathode ray tube (CRT) or light emitting diode (LED) monitor, for displaying information to a computer user. Input device 1114, which may include alphanumeric and other keys, is coupled to bus 1102 for communicating information and command selections to processor 1104. Another type of user input device is cursor control 1116, such as a mouse, a trackball, touchscreen, or cursor direction keys for communicating direction information and command selections to processor 1104 and for controlling cursor movement on display 1112. Input device 1114 typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 1100 can receive the data on the network line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause:
receiving registration data for a plurality of queries to run a validation test within a database during at least one data entry period, wherein the registration data associates a subsystem of a plurality of subsystems subject to the validation test that have access to the database with at least a first query of the plurality of queries, wherein the first query accesses a set of data in the database to monitor during the data entry period, wherein the data entry period corresponds to a window of time when a plurality of users that share the database are permitted to modify data within the database, wherein the registration data indicates whether each query of the plurality of queries is an informational query or a comparison query;
determining a schedule for executing the plurality of queries within the data entry period based on a start time when the plurality of users that share the database are permitted to modify data within the database, wherein comparison queries are scheduled to execute more frequently than informational queries during the data entry period;
executing the first query a first time to generate a first query result;
executing the first query at least a second time during the data entry period based on the schedule to generate a second query result;
aggregating validation results for the plurality of subsystems subject to the validation test based on results of executing the plurality of queries, wherein a validation result for the subsystem is determined, based on a comparison of the first query result and the second query result and the subsystem with which the first query is registered, that the subsystem has failed the validation test generating a set of one or more notifications based on which subsystems of the plurality of subsystems have failed the validation test according to the validation results, wherein execution scheduling, validation results, and notifications for each query are generated based at least in part on whether the query is an informational query or a comparison query; and
generating a set of one or more notifications based on which subsystems of the plurality of subsystems have failed the validation test according to the validation results, wherein execution scheduling, validation results, and notifications for each query are generated based at least in part on whether the query is an informational query or a comparison query.

2. The one or more non-transitory computer-readable media of claim 1, wherein the instructions further cause: receiving a notification list for the first query in the registration data, wherein the notification list identifies a plurality of recipients for a notification in the set of one or more notifications; and sending the notification to the plurality of recipients responsive to determining that the first query result is different than the second query result.

3. The one or more non-transitory computer readable media of claim 1, wherein the instructions further cause: receiving timing information from a user that identifies when to execute the first query during the data entry period.

4. The one or more non-transitory computer readable media of claim 1, wherein the first query is executed at a start of each data entry window of a plurality of data entry windows.

5. The one or more non-transitory computer readable media of claim 1, wherein the first query is executed at an end of each data entry window of a plurality of data entry windows.

6. The one or more non-transitory computer readable media of claim 1, wherein the first query is executed periodically during the data entry period.

7. The one or more non-transitory computer readable media of claim 1, wherein the notification highlights how the set of data was modified between the first time and the second time.

8. The one or more non-transitory computer readable media of claim 1, wherein the notification highlights a change between the first query result and the second query result.

9. The one or more non-transitory computer readable media of claim 1, wherein at least one notification of the set of one or more notifications identifies new data that was added to the set of data after the first query was executed the first time.

10. The one or more non-transitory computer readable media of claim 1, wherein at least one notification of the set of one or more notifications identifies data that was deleted from the set of data after the first query was executed the first time.

11. The one or more non-transitory computer readable media of claim 1, wherein the first query result is generated before the data entry period begins.

12. The one or more non-transitory computer readable media of claim 1, wherein the instructions further cause: updating an expected result for the first query based on the second query result; and generating a second notification in response to detecting that a subsequent result of executing the first query is different than the second query result.

13. The one or more non-transitory computer readable media of claim 1, wherein the instructions further cause: rolling back a change to the set of data that caused a difference between the first query result and the second query result.

14. The one or more non-transitory computer readable media of claim 1, wherein the instructions further cause: presenting a dashboard interface that identifies which subsystems of the plurality of subsystems have failed validations.

15. The one or more non-transitory computer readable media of claim 1, wherein the instructions further cause: presenting a subset of the plurality of queries registered with the subsystem, wherein the subset of the plurality of queries only includes queries for which a failed validation was detected during the data entry period.

16. The one or more non-transitory computer readable media of claim 1, wherein the instructions further cause: storing the first query result in a temporary table during a testing phase of a database template.

17. The one or more non-transitory computer readable media of claim 1, wherein the subsystem is a component from a suite of applications that share access to the database; wherein the notification is sent to at least one member of a team associated with the component and indicates that a change from another team caused the component to fail the validation test.

18. A system comprising:
one or more hardware processors;
one or more non-transitory computer-readable media storing instructions, which when executed by the one or more hardware processors, cause:

receiving registration data for a plurality of queries to run a validation test within a database during at least one data entry period, wherein the registration data associates a subsystem of a plurality of subsystems subject to the validation test that have access to the database with at least a first query of the plurality of queries, wherein the first query accesses a set of data in the database to monitor during the data entry period, wherein the data entry period corresponds to a window of time when a plurality of users that share the database are permitted to modify data within the database, wherein the registration data indicates whether each query of the plurality of queries is an informational query or a comparison query;

determining a schedule for executing the plurality of queries within the data entry period based on a start time when the plurality of users that share the database are permitted to modify data within the database, wherein comparison queries are scheduled to execute more frequently than informational queries during the data entry period;

executing the first query a first time to generate a first query result;

executing the first query at least a second time during the data entry period based on the schedule to generate a second query result;

aggregating validation results for the plurality of subsystems subject to the validation test based on results of executing the plurality of queries, wherein a validation result for the subsystem is determined, based on a comparison of the first query result and the second query result and the subsystem with which the first query is registered, that the subsystem has failed the validation test generating a set of one or more notifications based on which subsystems of the plurality of subsystems have failed the validation test according to the validation results, wherein execution scheduling, validation results, and notifications for each query are generated based at least in part on whether the query is an informational query or a comparison query; and generating a set of one or more notifications based on which subsystems of the plurality of subsystems have failed the validation test according to the validation results.

19. A method comprising:

receiving registration data for a plurality of queries to run a validation test within a database during at least one data entry period, wherein the registration data associates a subsystem of a plurality of subsystems subject to the validation test that have access to the database with at least a first query of the plurality of queries, wherein the first query accesses a set of data in the database to monitor during the data entry period, wherein the data entry period corresponds to a window of time when a plurality of users that share the database are permitted to modify data within the database, wherein the registration data indicates whether each query of the plurality of queries is an informational query or a comparison query;

determining a schedule for executing the plurality of queries within the data entry period based on a start time when the plurality of users that share the database are permitted to modify data within the database, wherein comparison queries are scheduled to execute more frequently than informational queries during the data entry period;

executing the first query a first time to generate a first query result;

executing the first query at least a second time during the data entry period based on the schedule to generate a second query result;

aggregating validation results for the plurality of subsystems subject to the validation test based on results of executing the plurality of queries, wherein a validation result for the subsystem is determined, based on a comparison of the first query result and the second query result and the subsystem with which the first query is registered, that the subsystem has failed the validation test generating a set of one or more notifications based on which subsystems of the plurality of subsystems have failed the validation test according to the validation results, wherein execution scheduling, validation results, and notifications for each query are generated based at least in part on whether the query is an informational query or a comparison query; and generating a set of one or more notifications based on which subsystems of the plurality of subsystems have failed the validation test according to the validation results.

20. The method of claim 19, wherein the subsystem is a component from a suite of applications that share access to the database; wherein the notification is sent to at least one member of a team associated with the component and indicates that a change from another team caused the component to fail the validation test.

\* \* \* \* \*

UNITED STATES PATENT AND TRADEMARK OFFICE
CERTIFICATE OF CORRECTION

PATENT NO. : 12,066,919 B2
APPLICATION NO. : 17/473625
DATED : August 20, 2024
INVENTOR(S) : Lara et al.

It is certified that error appears in the above-identified patent and that said Letters Patent is hereby corrected as shown below:

On the Title Page

In item (57), the Abstract on Column 2, Line 4, delete "potential a" and insert -- a potential --, therefor.

In the Drawings

On sheet 9 of 12, in FIG. 9, Line 1, delete "Enviornment" and insert -- Environment --, therefor.

In the Claims

In Column 19, Line 2, in Claim 1, delete "computer-readable" and insert -- computer readable --, therefor.

In Column 19, Line 52, in Claim 2, delete "computer-readable" and insert -- computer readable --, therefor.

In Column 20, Line 65, in Claim 18, delete "computer-readable" and insert -- computer readable --, therefor.

Signed and Sealed this
Tenth Day of December, 2024

Katherine Kelly Vidal
*Director of the United States Patent and Trademark Office*